US010408020B2

(12) United States Patent
Rajagopalan et al.

(10) Patent No.: US 10,408,020 B2
(45) Date of Patent: Sep. 10, 2019

(54) DIRECT CURRENT POWER SOURCE WITH REDUCED LINK CAPACITANCE FOR DOWNHOLE APPLICATIONS

(71) Applicant: Halliburton Energy Services, Inc., Houston, TX (US)

(72) Inventors: Satish Rajagopalan, Tomball, TX (US); Hugh Douglas, Cheltenham (GB)

(73) Assignee: Halliburton Energy Services, Inc., Houston, TX (US)

( * ) Notice: Subject to any disclaimer, the term of this patent is extended or adjusted under 35 U.S.C. 154(b) by 248 days.

(21) Appl. No.: 15/313,876

(22) PCT Filed: Dec. 30, 2015

(86) PCT No.: PCT/US2015/067996
§ 371 (c)(1),
(2) Date: Nov. 23, 2016

(87) PCT Pub. No.: WO2017/116428
PCT Pub. Date: Jul. 6, 2017

(65) Prior Publication Data
US 2018/0223632 A1 Aug. 9, 2018

(51) Int. Cl.
*E21B 41/00* (2006.01)
*H02K 11/04* (2016.01)
(Continued)

(52) U.S. Cl.
CPC .......... *E21B 41/0085* (2013.01); *H02K 7/18* (2013.01); *H02K 7/1823* (2013.01);
(Continued)

(58) Field of Classification Search
None
See application file for complete search history.

(56) References Cited

U.S. PATENT DOCUMENTS

| 1,969,093 A | 8/1934 | Poth |
| 2,885,569 A | 5/1959 | Schuh et al. |

(Continued)

FOREIGN PATENT DOCUMENTS

| GB | 857687 A | 1/1961 |
| GB | 1089260 A | 11/1967 |
| RU | 2460192 C1 | 8/2012 |

OTHER PUBLICATIONS

International Preliminary Report on Patentability issued in related PCT Application No. PCT/US2015/067996 dated Jul. 12, 2018, 14 pages.

(Continued)

*Primary Examiner* — David J Bagnell
*Assistant Examiner* — Brandon M Duck
(74) *Attorney, Agent, or Firm* — Jason Sedano; Baker Botts L.L.P.

(57) ABSTRACT

An example downhole power generation apparatus may include a turbine and a drive shaft coupled to the turbine. A plurality of alternators may be coupled to the drive shaft and electrically connected in parallel. When the drive shaft rotates, the plurality of alternators may generate phase-offset alternating current (AC) power signals. AC-to-direct current (DC) conversion circuitry may be coupled to the plurality of alternators.

20 Claims, 5 Drawing Sheets

(51) Int. Cl.
*H02K 7/18* (2006.01)
*H02K 16/00* (2006.01)
*H02P 29/50* (2016.01)
*E21B 47/00* (2012.01)
*E21B 49/00* (2006.01)

(52) U.S. Cl.
CPC ........... *H02K 11/046* (2013.01); *H02K 16/00* (2013.01); *H02P 29/50* (2016.02); *E21B 47/00* (2013.01); *E21B 49/00* (2013.01); *H02K 11/04* (2013.01)

(56) References Cited

U.S. PATENT DOCUMENTS

| | | | |
|---|---|---|---|
| 2,928,007 A | 3/1960 | Pratt | |
| 2,945,141 A | 7/1960 | Van De Graff et al. | |
| 3,185,857 A | 5/1965 | Johnson | |
| 3,321,638 A | 5/1967 | Pratt | |
| 4,780,659 A | 10/1988 | Bansal et al. | |
| 5,293,089 A | 3/1994 | Frister | |
| 5,723,972 A | 3/1998 | Bartol et al. | |
| 6,191,561 B1* | 2/2001 | Bartel | H02P 9/40 322/51 |
| 7,429,802 B2 | 9/2008 | Mukai et al. | |
| 7,834,777 B2* | 11/2010 | Gold | E21B 41/0085 166/66 |
| 7,944,187 B2 | 5/2011 | Dooley | |
| 2010/0026010 A1 | 2/2010 | Pabst | |
| 2010/0117475 A1 | 5/2010 | Leonardi et al. | |
| 2012/0074707 A1 | 3/2012 | Pedersen | |
| 2013/0235626 A1 | 9/2013 | Jang et al. | |
| 2015/0034294 A1* | 2/2015 | Miles | E21B 47/122 166/66.5 |

OTHER PUBLICATIONS

Perreault, David J., and John G. Kassakian. "Distributed interleaving of paralleled power converters." IEEE Transactions on Circuits and Systems I: Fundamental Theory and Applications 44.8 (1997): 728-734.

"Downhole Power Generation and Wireless Communications for Intelligent Completion Applications," Paper DE-FC26-02NT41601, 2004, found at https://www.netl.doe.gov/kmd/cds/disk11/pdfs/nt41601.pdf, 4 pages.

International Search Report and Written Opinion issued in related PCT Application No. PCT/US2015/067996 dated Sep. 6, 2016, 17 pages.

* cited by examiner

DIRECT CURRENT POWER SOURCE WITH REDUCED LINK CAPACITANCE FOR DOWNHOLE APPLICATIONS

CROSS-REFERENCE TO RELATED APPLICATION

The present application is a U.S. National Stage Application of International Application No. PCT/US2015/067996 filed Dec. 30, 2015, which is incorporated herein by reference in its entirety for all purposes.

BACKGROUND

The present disclosure relates generally to hydrocarbon recovery operations and, more particularly, to a direct current (DC) power source with reduced link capacitance for downhole applications.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. Some or all of these steps may utilize electronic elements located downhole that require DC power to operate. That DC power can be provided by converting alternating current (AC) power produced by a downhole alternator. Converted DC power, however, can include voltage fluctuations or "ripples" that can damage electronic equipment. In certain embodiments, link capacitance may be provided in the form of a bank of capacitors to smooth the ripples and produce a more constant DC signal. Due to harsh downhole conditions, typical capacitor banks use high-temperature rated capacitors. High temperature ratings often accompany lower voltage capacity, such that large matrices of high temperature-rated capacitors are needed. These matrices have low reliability, and can be bulky, expensive, and difficult to repair.

BRIEF DESCRIPTION OF THE DRAWING(S)

Some specific exemplary embodiments of the disclosure may be understood by referring, in part, to the following description and the accompanying drawings.

DETAILED DESCRIPTION OF THE DISCLOSURE

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The terms "couple" or "couples" as used herein are intended to mean either an indirect or a direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "fluidically coupled" as used herein is intended to mean that there is either a direct or an indirect fluid flow path between two components.

According to aspects of the present disclosure, a downhole power generator with parallel-connected alternators that generate phase-offset power output signals may be used to produce a DC power signal using a lower link capacitance than a power source with a single alternator. As will be described in detail below, the phase-offset power output signals may combine to form a single signal with a higher ripple frequency and lower ripple amplitude than a DC signal produced by a single alternator. The higher ripple frequency and smaller ripple amplitude may mean that the link capacitance and number of capacitors needed to smooth the ripple may be reduced. Reducing the number of capacitors may decrease the size, complexity, and expense of any associated capacitor bank and power generator.

Figure 1:
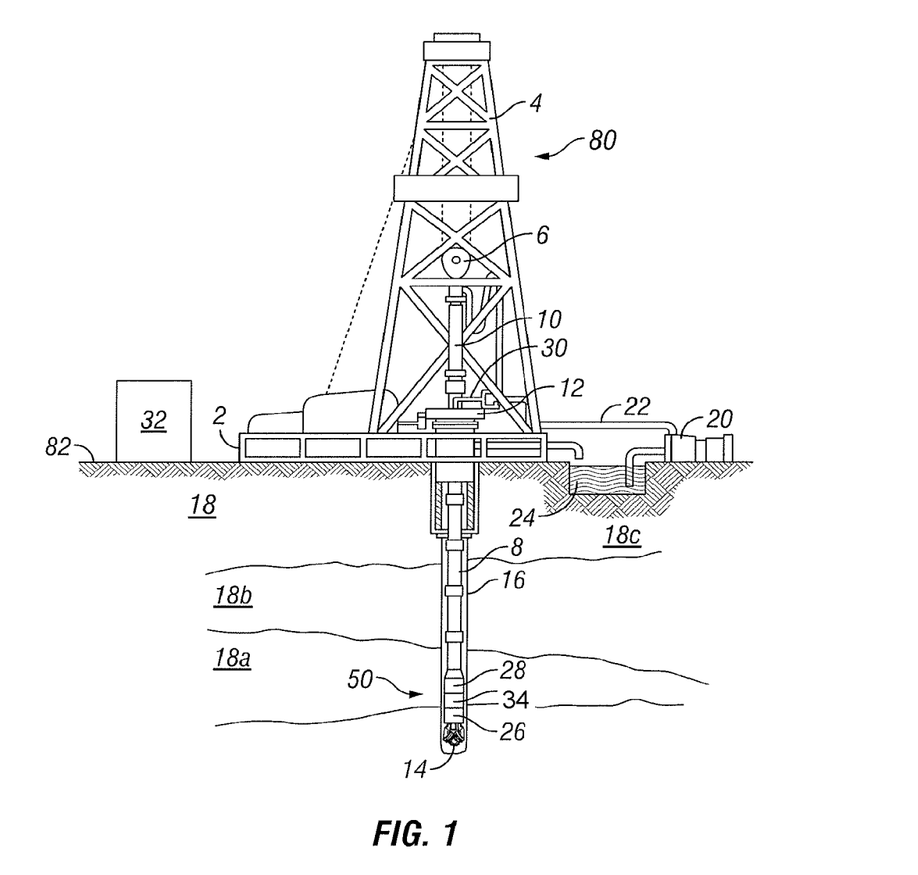
FIG. 1 is a diagram of an example subterranean drilling system, according to aspects of the present disclosure.

FIG. 1 is a diagram of a subterranean drilling system 80, according to aspects of the present disclosure. The drilling system 80 comprises a drilling platform 2 positioned at the surface 82. In the embodiment shown, the surface 82 comprises the top of a formation 18 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) 50 coupled to the drill string 8 near the drill bit 14. The BHA 50 may comprise different combinations of drill collars; subs such as stabilizers, reamers, shocks, hole-openers; and various downhole tools, including, but not limited to, LWD/MWD systems, telemetry systems, downhole motors to drive the drill bit 14, and rotary steerable assemblies for changing the drilling direction of the drill bit 14. As depicted, the BHA 50 comprises LWD/MWD elements 26, telemetry element 28, and downhole power generator 34. As the bit 14 extends the borehole 16 through the formations 18, the LWD/MWD elements 26 may collect measurements relating to borehole 16. The LWD/MWD elements 26 may be communicably coupled to a telemetry element 28. The telemetry element 28 may transfer measurements from LWD/MWD elements 26 to a surface receiver 30 and/or to receive commands from the surface receiver 30 via a surface information handling system 32. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the LWD/MWD elements 26 may also be stored within the LWD/MWD elements 26 or the telemetry element 28 for later retrieval at the surface 82 by the information handling system 32.

The downhole power generator 34 may be coupled and provide power to electronic components within the BHA 50, including electronic components within the LWD/MWD elements 26 and telemetry system 28. Example electronic components include, but are not limited to, sensors, control units, motors, and solenoids. The power generator 34 may comprise parallel-connected alternators (not shown) that generate phase-offset AC power output signals in response to drilling fluid flow through the drill string 8 and BHA 50. The amount of power provided by the generator 34 may depend, in part, on the power requirements of the electronic components in the BHA 50, the number of alternators within the generator 34, and the power ratings of the electronic components within the generator 34.

The phase-offset AC power signals output by the alternators (not shown) may be converted to DC, combined, and transmitted to the electronics components within the BHA 50 through a bank of capacitors (not shown) that provide a link capacitance. As will be described in detail below, a voltage ripple in the combined DC signal may be lower in amplitude and higher in frequency than a typical DC signal produced by a single alternator and associated electronics. This may lead to a lower link capacitance, which may result in a capacitor bank with reduced size, complexity and expense. Additionally, alternators with lower power ratings can be used, as each need provide only a portion of the power required by the electronics within the BHA 50.

Modifications, additions, or omissions may be made to FIG. 1 without departing from the scope of the present disclosure. For instance, the BHA 50 may comprise different combinations and orientations of downhole tools and elements, some or all of which may comprise electronic components. Additionally, the positioning and configuration of the power generator 34 may differ from the embodiment depicted.

Figure 2:
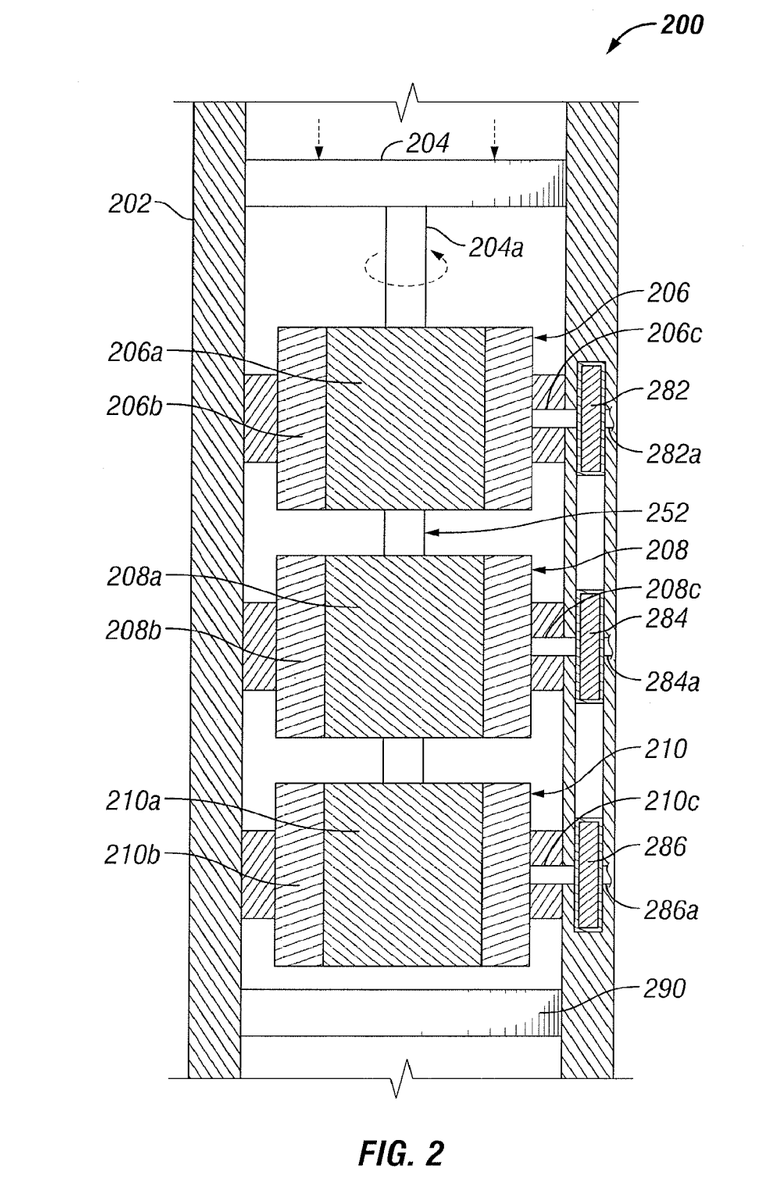
FIG. 2 is a diagram of an example power generator, according to aspects of the present disclosure.

FIG. 2 is a diagram of an example downhole power generator 200, according to aspects of the present disclosure. As depicted, the downhole power generator 200 is positioned within an outer housing 202, such as a drill collar, that may be coupled to other elements of a BHA in a drilling system, including, but not limited to, the BHA and drilling system depicted in FIG. 1. The downhole power generator 200 and outer housing 202 may comprise or include similar functionality to the downhole power generator described above. The particular configuration of the power generator 200 and outer housing 202, however, are not intended to be limiting. Rather, the power generator 200 may be used with a differently configured housing, integrated into a larger tool, and/or used outside of the BHA/drilling system context, such as within a wireline or slickline tool. Additionally, as will be described in detail below, the power generator 200 itself may be configured differently depending on the manner in which it will be used.

The downhole power generator 200 comprises a turbine 204, a drive shaft 204a coupled to and driven by the turbine 204, and a plurality of alternators 206-210 coupled to the drive shaft 204a and electrically connected in parallel. Although three alternators 206-210 are depicted, the plurality of alternators may comprise two or more alternators. Each of the alternators 206-210 may comprise respective rotors 206a-210a and stators 206b-210b. As depicted, the stators 206b-210b of the alternators 206-210 may be rotationally fixed with respect to the outer housing 202, with the respective rotors 206a-210a free to rotate therein. In other embodiments, the stators 206b-210b may be located within the rotors 206a-210a, with the stators 206b-210b rotationally fixed with respect to the outer housing 202 and the respective rotors 206a-210a free to rotate around the stators 206b-210b.

The stators 206b-210b may be rotationally fixed with respect to one another and the housing 202, and the rotors 206a-210a may be rotationally fixed with respect to one another such that they rotate together at the same speed. As depicted, the rotors 206a-210a are coupled to the drive shaft 204a via a shaft 252 to which the rotors 206a-210a are coupled. In other embodiments, one or more of the rotors 206a-210a may comprise individual shafts, and the individual shafts may be coupled together and coupled to the drive shaft 204a such that the rotors 206a-210a are driven by the turbine 204 and rotate together at the same speed. One more of the rotors 206a-210a may also be formed on a single shaft that is coupled to a drive shaft of the turbine 204. Additionally, the shaft 252 and drive shaft 204a may be integrated such that the rotors 206a-210a may be directly coupled to the turbine 204 through the shaft 252, rather than through a devoted drive shaft 204a of the turbine 204. Although a direct coupling between the drive shaft 204a and shaft 252 is shown, one or more intermediary devices, such as a gear box (not shown) that regulates the rotation of the rotors 206a-210a, may be coupled between the shaft 252 and the drive shaft 204a.

The generator 200 may further include AC-to-direct current (DC) conversion circuitry 282-286 coupled to the alternators 206-210 through respective output leads 206c-210c. Example conversion circuitry includes, but is not limited to, rectification circuits and power factor correction circuitry. As depicted, the conversion circuitry 282-286 comprises multiple conversion circuits that are dedicated and coupled to the output leads 206c-210c of one of the alternators 206-210. Each of the conversion circuits 282-286, in turn, may comprise respective output leads 282a-286a on which they produce a converted DC power signal corresponding to AC power signals produced by the associated alternator 206-210. The output leads 282a-286a of the conversion circuitry 282-286 may be combined in parallel, such that the alternators 206-210 are connected in parallel through the conversion circuitry 282-286 and the DC power signals produced by the conversion circuitry 282-286 are combined into a single DC power signal. This configuration is not intended to be limiting, however, as the conversion circuitry 282-286 may comprise combined circuitry rather than individual circuitry, or a single circuit that coverts a combined AC power signal from the alternators 206-210 produced through a parallel connection of the alternators 206-210 before the conversion circuitry 282-286. Additionally, although the conversion circuitry 282-286 is depicted as a series of boxes within the housing 202, the configuration, location and orientation of the conversion circuitry conversion circuitry 282-286 may change depending on the application.

The generator 200 may further comprise a link capacitance in the form of a bank of capacitors 290. The bank of capacitors 290 may be coupled in parallel with the output leads 282a-286a of the conversion circuitry 282-286, such that DC power signals output by the conversion circuitry 282-286 are received in parallel and combined at the capacitors 290. This configuration is not intended to be limiting, however, as the bank of capacitors 290 may be connected in different configurations with the alternators 206-210 and conversion circuitry 282-286. Additionally, although the bank of capacitors 290 is depicted within a sealed enclosure in the internal bore of the housing 202, the bank of capacitors 290 may be positioned at different locations and orientations within the housing 202 without departing from the scope of this disclosure.

When the power generator 200 is in use, such as when it is incorporated into a BHA, for instance, fluid flow through the housing 202 may cause the turbine 204 to rotate and drive the rotors 206a-210a or the alternators 206-210. The driven alternators 206-210 may produce separate phase-offset AC power signals at their respective output leads 206c-210c. The phase-offset AC power signals may be received from the alternators 206-210 at the conversions circuitry 282-286, where the AC signals are converted to DC signals, such as through full-wave or half-wave rectification, that maintain the phase-offsets of the original AC signals. The phase-offset DC signals may then be combined into a single DC signal through the parallel connection of the conversion circuitry 282-286. The combined DC signal may then pass through the bank of capacitors 290 before being transmitted to electronic elements coupled to and configured to receive DC power from the generator 200.

According to aspects of the present disclosure, the alternators 206-210 may be configured to generate phase-offset AC power signals through physical and/or structural manipulations of the alternators 206-210. As would be appreciated by one of ordinary skill in the art in view of this disclosure, the rotors 206a-210a may comprise magnetic cores characterized by magnetic poles, and the stators 206b-210b may comprise coils or wire similarly characterized by magnetic poles. In certain embodiments, the alternators 206-210 may be configured to generate phase-offset AC power signals by manually positioning the magnetic poles of the rotors 206a-210a at different angular orientations with respect to one another and/or manually positioning the magnetic poles of the stator 206b-210b at different phase angles with respect to one another. The different angular orientations of the magnetic poles may produce corresponding phase offsets in the produced AC power signals, as will be described below.

Figure 3A:
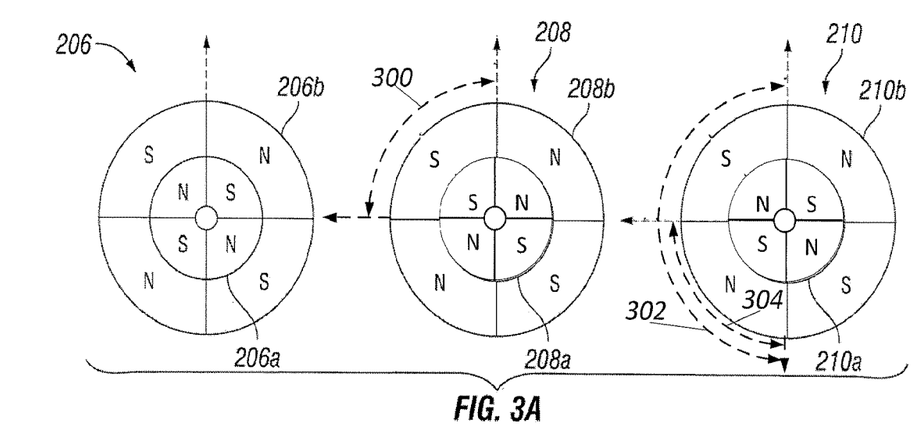
FIGS. 3A and 3B are diagrams of two example alternator configurations to produce phase-offset power signals, according to aspects of the present disclosure.
Figure 3B:
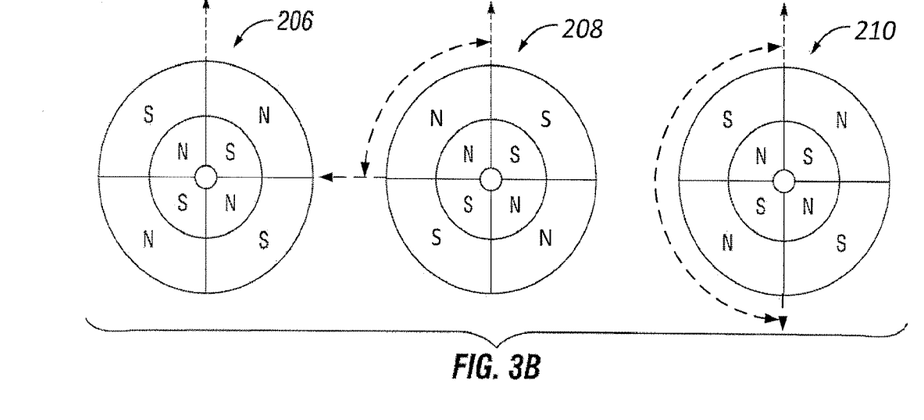

FIGS. 3A and 3B illustrate two example configurations of the alternators 206-210 in which the magnetic poles of the rotors 206a-210a and/or stators 206b-210b have been positioned to produce phase offset AC power signals. FIG. 3A, for instance, illustrates an embodiment in which the magnetic poles of the stators 206b-210b are aligned at substantially the same angle, and the magnetic poles of the rotors 206a-210a are positioned at different angular orientations. The magnetic poles of the rotors 206a-210a may positioned at different angular orientations with respect to the other rotors 206a-210a by, for instance, attaching or otherwise positioning the magnetic cores associated with the rotors 206a-210a at different angular orientations with respect to a drive shaft.

The magnetic poles of the rotor 208a are positioned at an angular orientation that is offset from the angular orientation of the magnetic poles of the rotor 206a by an angle 300. Similarly, the magnetic poles of the rotor 210a are positioned at an angular orientation that is offset from the angular orientation of the magnetic poles of the rotor 206a by an angle 302, and is offset from the angular orientation of the magnetic poles of the rotor 208a by an angle 304. As depicted, the angles 300 and 304 comprise an offset angle θ and the angle 302 comprises approximately twice the angle. In certain embodiments, the offset angle θ may be determined based, in part, on the number of parallel-connected alternators. For instance, the offset angle θ may be determined by dividing 360° by the number of alternators. Where there are three alternators, as shown in FIGS. 3A and 3B, the offset angle θ may comprise 120°, with the angles 300 and 304 comprising the offset angle θ and the angle 302 comprising two times the offset angle θ (240°). The configurations depicted are not intended to be limiting.

FIG. 3B illustrates a similar configuration to the configuration illustrated in FIG. 3A, except that the magnetic poles of the rotors 206a-210a are aligned at substantially the same angle, and the magnetic poles of the stators 206b-210b are positioned at offset angles 300, 302, and 304. The magnetic poles of the stators 206b-210b may be positioned at different angular orientations with respect to the other stators 206b-210b by, for instance, attaching or otherwise positioning the windings associated with the stators 206b-210b at different angular orientations with respect to a housing. Alternatively, or in addition to physically positioning the windings at different angular orientation, the stators 206b-210b may be wound to produce magnetic poles at different orientations.

Modifications, additions, or omissions may be made to FIG. 3A or 3B without departing from the scope of the present disclosure. For instance, although not depicted, in certain embodiments, the magnetic poles of both the rotors 206a-210a and the stators 206b-210b may be positioned or set to produce the necessary phase-offsets in the produced AC signal.

In addition to or instead of physically positioning the magnetic poles of rotors and/or stators to generate phase-offset signals, phase-offset signals may be generated through circuitry associated with the alternators. Example circuitry includes, but is not limited to, power factor correction (PFC) circuitry that may be incorporated into a power generator instead of or in addition to AC-to-DC conversion circuitry. For instance, PFC circuitry may be positioned between the alternators and the AC-to-DC conversion circuitry in the example power generator described above with reference to FIG. 2.

Figure 4:
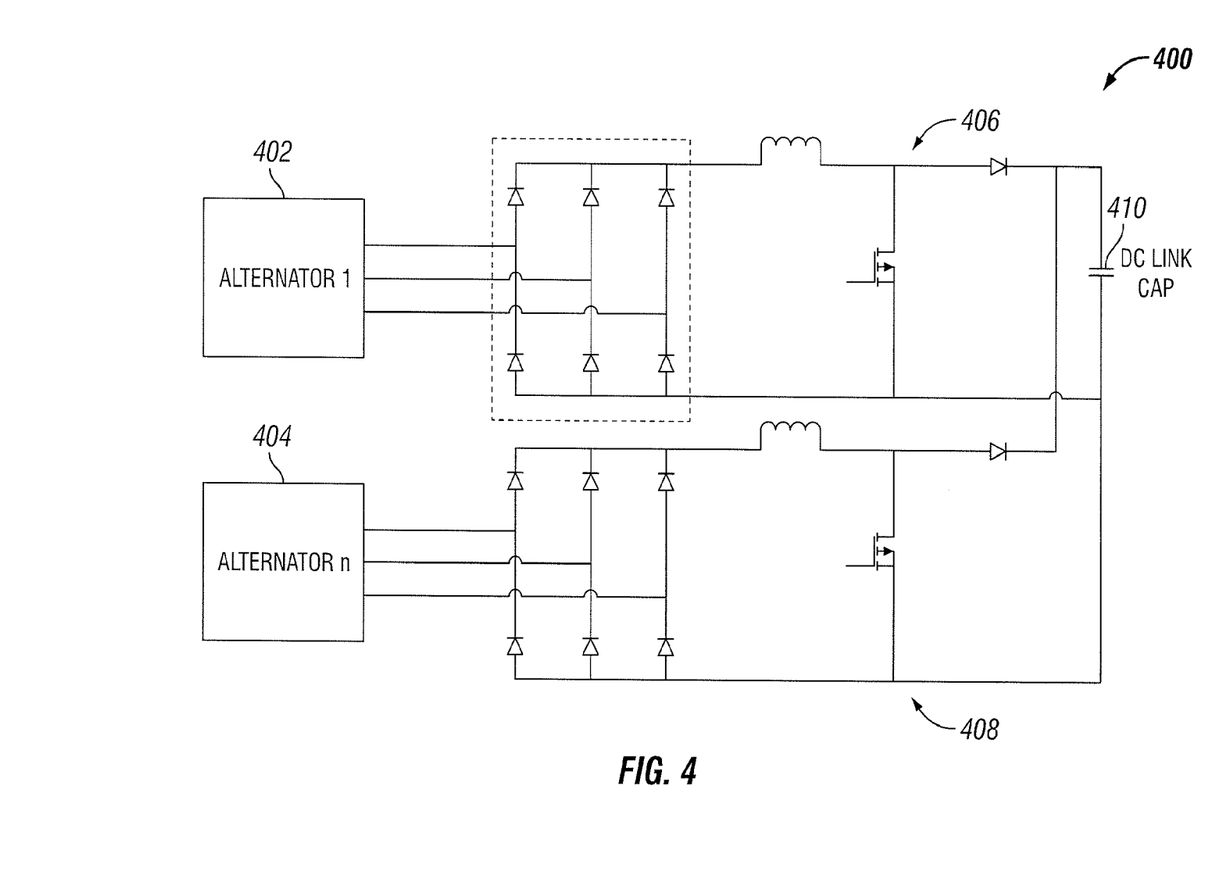
FIG. 4 is a diagram of another example alternator configuration to produce phase-offset power signals, according to aspects of the present disclosure.

FIG. 4 is a diagram illustrating an example downhole generator 400 in which phase-offset signals are generated, at least in part, through circuitry, according to aspects of the present disclosure. The downhole generator 400 comprises two alternators 402 and 404, which may, for instance, be connected to a drive shaft (not shown) and include rotors (not shown) that are rotationally fixed with respect to one another. The downhole generator 400 further comprises PFC circuitry 406 and 408 coupled to and respectively associated with the alternators 402 and 404. Outputs of the PFC circuitry 406 and 408 are connected in parallel with a link capacitance 410, such that the alternators 402 and 404 are electrically connected in parallel through the PFC circuitry 406 and 408.

PFC circuitry 406 comprises rectification circuitry 406a and phase-shift circuitry 406b. As depicted, PFC circuitry 408 has a similar configuration, but the PFC circuitry 406 and 408 is not required to be identical. The rectification circuitry 406a comprises three parallel circuits each containing two diodes, with each output lead 402a of the alternator 402 connected between the diodes of a different parallel circuit. The diodes may function to allow current flow in a single direction, such that any AC signal produced by the alternator 402 is rectified and converted to DC. The DC signal produced by the rectification circuitry 406a may be received at the phase-shift circuitry 406b, which comprises an inductor and a transistor. The inductor and transistor may cooperate to introduce a delay in the DC signal produced by the rectification circuitry 406a. The amount of delay may be selected with reference to any delay introduced by the PFC circuitry 408 to a signal produced by the alternator 404, such that the DC signals output by the PFC circuitry 406 and 408 comprise offset phases and combined to produce a DC signal at the link capacitance 410 with a lower ripple amplitude and higher ripple frequency than the phase-shifted DC signals comprise individually.

Modifications, additions, or omissions may be made to FIG. 4 without departing from the scope of the present disclosure. For instance, the number of alternators and configuration of the PFC circuitry may be modified. In certain embodiments, the PFC circuitry may not contain rectification circuitry, and may function to phase-shift the AC signals produced by the alternators 402 and 404 before rectification, or may function to phase shift DC signals generator after the AC signals produced by the alternators 402 and 404 are rectified.

Figure 5A:
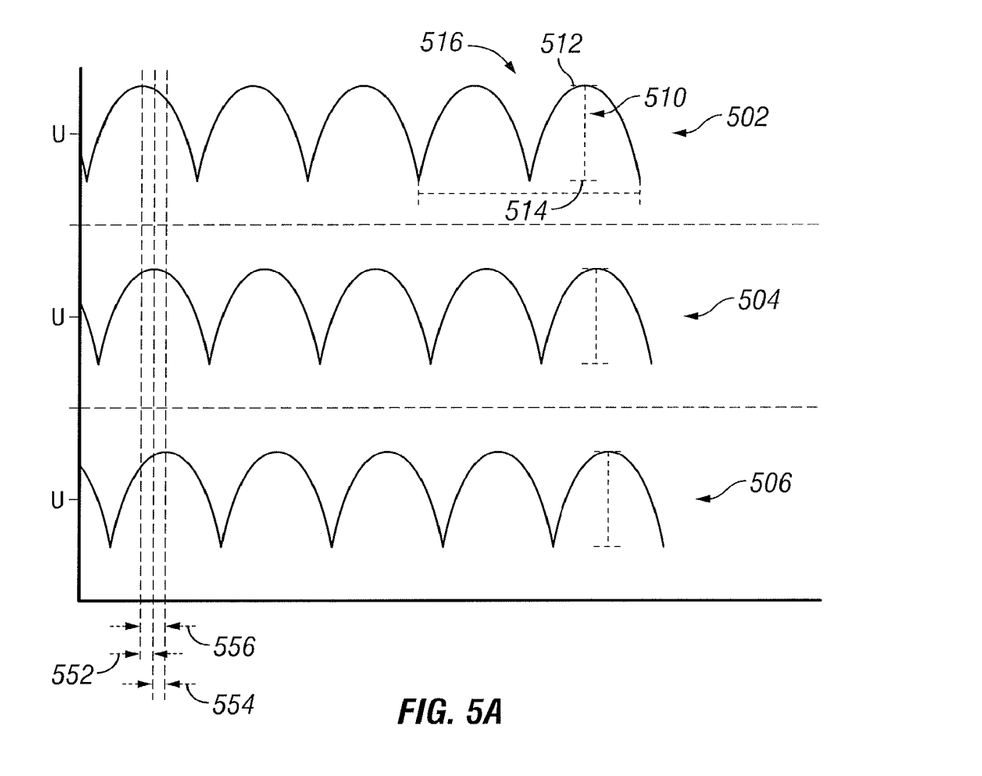
FIGS. 5A and 5B are diagrams respectively illustrating example phase-shifted DC signals, and an example DC signal produced through the parallel combination of the phase-shifted DC signals, according to aspects of the present disclosure While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.
Figure 5B:
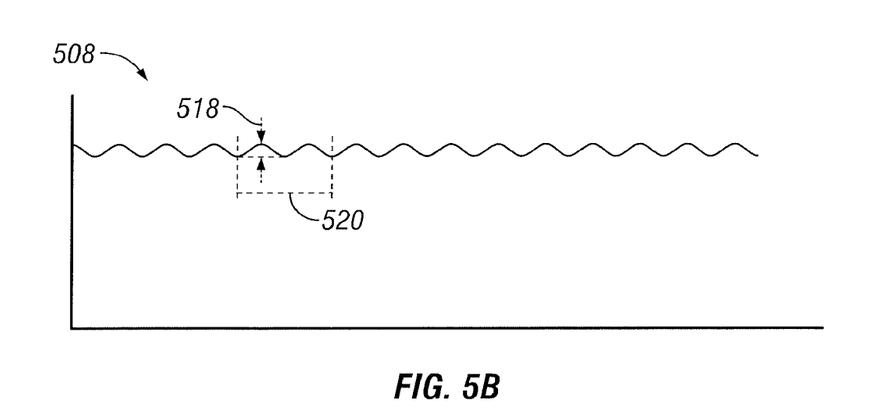

As stated above, a parallel combination of phase-offset signals may produce a combined signal with a smaller ripple amplitude and higher ripple frequency than the ripple amplitude and frequency of the phase-offset signals. To illustrate, FIGS. 5A and 5B are diagrams of example phase-offset signals 502-506 and an example combined signal 508. The phase-offset signals 502-506 may comprise DC power signals produced from phase-shifted sinusoidal AC power signals that have undergone full-wave rectification, and the combined signal 508 may comprise a DC power signal resulting from a parallel combination of the phase-offset signals 502-506. The phase-offset signals 502-506 and combined signal 508 may be the result of an alternator and conversion circuitry configuration similar to those described above, and may, for instance, respectively comprise the signals produced at the output leads 282a-286a of the conversion circuitry 282-286, and the signal received at the bank of capacitors 290 in the generator 200 discussed above with respect to the FIG. 2.

Each of the signals 502-508 may comprise a ripple amplitude and a ripple frequency. Signal 502, for instance, comprises a ripple amplitude 510 characterized by the difference between the highest voltage 512 and the lowest voltage 514 during one repeating cycle 516. Signal 502 may also comprise a ripple frequency corresponding to the frequency with which the cycle 416 repeats. As depicted, each of the signals 502-506 may have substantially the same ripple amplitude and frequency. In contrast, the combined DC power signal 508 comprises a smaller ripple amplitude 518 and a higher ripple frequency, as indicated by the repeating cycle 520 of the signal 508 having a shorter time duration than the duration of the repeating cycle 516 of the signal 502.

The ripple amplitude 518 and frequency of the combined signal 508 may be a function of the ripple amplitude and frequency of the signals 502-506 and their phase offsets. As depicted, the signal 504 is offset from signal 502 by a time 550, the signal 506 is offset from signal 504 by a time 552; and the signal 508 is offset from the signal 502 by a time 556 that correspond total of times 550 and 552. These times may correspond to the offset angles at the alternators that produced the signals 502-508, and may be referred to as phase offsets between the signals. For instance, increasing the offset angle between alternators may increase the phase offset, and decreasing the offset angle may decrease the phase offset. When combined in parallel, the signals 502-506 interact constructively and destructively such that the resulting signal 408 comprises smaller ripples that repeat more frequently. The shape, ripple amplitude, and ripple frequency of the combined signal 408, therefore, may depend on a number of factors, including the number of signals/alternators used to produce the combined signal and the phase offsets between the signals.

The reduced smaller ripple amplitude 518 and a higher ripple frequency of the combined signal 508 may provide for a reduction in link capacitance needed to smooth the signal 508 before it is used to power electronic elements. Because the link capacitance functions to smooth a signal by charging and discharging over time, the smaller ripple amplitude reduces the total voltage variation that must be accommodated by the link capacitance. Additionally, the high ripple frequency reduces the duration over which the link capacitance charges and discharges, which, in turn, reduces the percentage of the ripple voltage than must be stored within the link capacitance during a given cycle.

An example downhole power generation apparatus may include a turbine and a drive shaft coupled to the turbine. A plurality of alternators may be coupled to the drive shaft and electrically connected in parallel. When the drive shaft rotates, the plurality of alternators may generate phase-offset alternating current (AC) power signals. AC-to-direct current (DC) conversion circuitry may be coupled to the plurality of alternators.

In one or more embodiments described in the preceding paragraph, the plurality of alternators comprises rotors and stators, and the rotors are coupled to the drive shaft.

In one or more embodiments described in the preceding paragraph, the rotors comprise magnetic poles positioned at the same angular orientation with respect to the drive shaft, and the stators comprise magnetic poles positioned at different angular orientations with respect to the drive shaft.

In one or more embodiments described in the preceding paragraph, the stators are physically displaced at the different angular orientations with respect to the drive shaft, or the stators include winding configurations that establish magnetic poles at different angular orientations with respect to the drive shaft.

In one or more embodiments described in the preceding three paragraphs, the stators comprise magnetic poles positioned at the same angular orientation with respect to the drive shaft, and the rotors comprise magnetic poles positioned at different angular orientations with respect to the drive shaft.

In one or more embodiments described in the preceding paragraph, the rotors are displaced at the different angular orientations with respect to the drive shaft.

In one or more embodiments described in the preceding five paragraphs, the rotors comprise magnetic positioned at different angular orientations with respect to the drive shaft, and the stators comprise magnetic poles positioned at different angular orientations with respect to the drive shaft.

In one or more embodiments described in the preceding six paragraphs, the different angular orientations depend, in part, on the number of alternators.

In one or more embodiments described in the preceding six paragraphs the different angular orientations comprise multiples of an offset angle that depends, in part, on the number of alternators.

According to aspects of the present disclosure, an example method may include positioning a power generator within a borehole and generating phase-offset direct current DC power signals at the power generator. The phase-offset DC power signals may be combined. The combined DC power signal may be provided to an electronic element coupled to the power generator.

In one or more embodiments described in the preceding paragraph, positioning the power generator within the borehole comprises positioning a plurality of alternators within the borehole, wherein the plurality of alternators are coupled to a drive shaft.

In one or more embodiments described in the preceding paragraph, generating phase-offset DC power signals at the power generator comprises generating phase offset AC power signals with the plurality of alternators and converting the phase-offset AC power signals into the phase-offset DC power signals.

In one or more embodiments described in the preceding paragraph, wherein generating the phase offset AC power signals with the plurality of alternators comprises rotating the rotors within the stator using the drive shaft, wherein the rotors comprise magnetic poles positioned at the same angular orientation with respect to the drive shaft, and the stators comprise magnetic poles positioned at different angular orientations with respect to the drive shaft; the stators comprise magnetic poles positioned at the same angular orientation with respect to the drive shaft, and the rotors comprise magnetic poles positioned at different angular orientations with respect to the drive shaft; or the stators comprise magnetic poles positioned at different angular orientations with respect to the drive shaft, and the rotors comprise magnetic poles positioned at different angular orientations with respect to the drive shaft.

In one or more embodiments described in the preceding paragraph, the different angular orientations depend, in part, on the number of alternators.

In one or more embodiments described in the preceding two paragraphs, the different angular orientations comprise multiples of an offset angle that depends, in part, on the number of alternators.

In one or more embodiments described in the preceding six paragraphs, generating phase-offset DC power signals at the power generator comprises generating AC power signals with the plurality of alternators and phase shifting at least one of the generated AC power signals and then converting the generated AC power signals to the phase-offset DC power signals; or converting the generated AC power signals to DC power signals and phase shifting at least one of the DC power signals.

In one or more embodiments described in the preceding paragraph, phase shifting at least one of the generated AC power signals comprises phase shifting at least one of the generated AC power signals using power factor correction circuitry coupled to the alternators; and phase shifting at least one of the DC power signals comprises rectifying the generated AC power signals and phase shifting at least one of the DC power signals using power factor correction circuitry coupled to the alternators.

According to aspects of the present disclosure, an example downhole power generation apparatus may include a turbine and a drive shaft coupled to the turbine. A plurality of alternators may be coupled to the drive shaft and electrically connected in parallel. When the drive shaft rotates, the plurality of alternators generates alternating current (AC) power signals. Power factor correction circuitry may be coupled to each one of the plurality of alternators to phase-shift at least one of the generated AC power signals.

In one or more embodiments described in the preceding paragraph, the power factor correction circuitry comprises rectification circuitry and phase shift circuitry.

In one or more embodiments described in the preceding paragraph, the plurality of alternators is electrically connected in parallel through the power factor correction circuitry.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A downhole power generation apparatus, comprising:
a turbine;
a drive shaft coupled to the turbine;
a plurality of alternators coupled to the drive shaft and electrically connected in parallel, wherein when the drive shaft rotates, the plurality of alternators generate phase-offset alternating current (AC) power signals; and
an AC-to-direct current (DC) conversion circuitry coupled to the plurality of alternators through a respective alternator output lead of a plurality of alternator output leads, wherein the AC-to-DC conversion circuitry comprises a plurality of conversion circuits, wherein each of the plurality of conversion circuits comprises a respective conversion circuit output lead of a plurality of conversion circuit output leads, and wherein each of the plurality of conversion circuit output leads are combined in parallel such that the plurality of alternators are connected in parallel through the plurality of conversion circuits; and
a bank of one or more capacitors coupled in parallel with the plurality of conversion circuit output leads.

2. The downhole power generation apparatus of claim 1, wherein the plurality of alternators comprise rotors and stators, and the rotors are coupled to the drive shaft.

3. The downhole power generation apparatus of claim 2, wherein the rotors comprise magnetic poles positioned at the same angular orientation with respect to the drive shaft, and the stators comprise magnetic poles positioned at different angular orientations with respect to the drive shaft.

4. The downhole power generation apparatus of claim 3, wherein the stators are physically displaced at the different angular orientations with respect to the drive shaft, or the stators include winding configurations that establish magnetic poles at different angular orientations with respect to the drive shaft.

5. The downhole power generation apparatus of claim 3, wherein the different angular orientations depend, in part, on the number of alternators.

6. The downhole power generation apparatus of claim 3, wherein the different angular orientations comprise multiples of an offset angle that depends, in part, on the number of alternators.

7. The downhole power generation apparatus of claim 2, wherein the stators comprise magnetic poles positioned at the same angular orientation with respect to the drive shaft, and the rotors comprise magnetic poles positioned at different angular orientations with respect to the drive shaft.

8. The downhole power generation apparatus of claim 2, wherein the rotors are displaced at the different angular orientations with respect to the drive shaft.

9. The downhole power generation apparatus of claim 2, wherein the rotors comprise magnetic positioned at different angular orientations with respect to the drive shaft, and the stators comprise magnetic poles positioned at different angular orientations with respect to the drive shaft.

10. A method, comprising:
positioning a power generator within a borehole;
generating phase-offset direct current DC power signals at the power generator;
combining the phase-offset DC power signals, wherein the phase-offset DC power signals are combined using a plurality of conversion circuits, wherein each of the plurality of conversion circuits comprises a respective conversion circuit output lead of a plurality of conversion circuit output leads, and wherein each of the plurality of conversion circuit output leads are combined; and
providing the combined DC power signal through a bank of one or more capacitors coupled in parallel with the plurality of conversion circuit output leads of the power generator.

11. The method of claim 10, wherein positioning the power generator within the borehole comprises positioning a plurality of alternators within the borehole, wherein the plurality of alternators are coupled to a drive shaft.

12. The method of claim 11, wherein generating phase-offset DC power signals at the power generator comprises generating phase offset AC power signals with the plurality of alternators and converting the phase-offset AC power signals into the phase-offset DC power signals.

13. The method of claim 12, wherein generating the phase offset AC power signals with the plurality of alternators comprises rotating the rotors within the stator using the drive shaft, wherein
- the rotors comprise magnetic poles positioned at the same angular orientation with respect to the drive shaft, and the stators comprise magnetic poles positioned at different angular orientations with respect to the drive shaft;
- the stators comprise magnetic poles positioned at the same angular orientation with respect to the drive shaft, and the rotors comprise magnetic poles positioned at different angular orientations with respect to the drive shaft; or
- the stators comprise magnetic poles positioned at different angular orientations with respect to the drive shaft, and the rotors comprise magnetic poles positioned at different angular orientations with respect to the drive shaft.

14. The method of claim 13, wherein the different angular orientations depend, in part, on the number of alternators.

15. The method of claim 13, wherein the different angular orientations comprise multiples of an offset angle that depends, in part, on the number of alternators.

16. The method of claim 11, wherein generating phase-offset DC power signals at the power generator comprises generating AC power signals with the plurality of alternators and
- phase shifting at least one of the generated AC power signals and then converting the generated AC power signals to the phase-offset DC power signals; or
- converting the generated AC power signals to DC power signals and phase shifting at least one of the DC power signals.

17. The method of claim 16, wherein
- phase shifting at least one of the generated AC power signals comprises phase shifting at least one of the generated AC power signals using power factor correction circuitry coupled to the alternators; and
- phase shifting at least one of the DC power signals comprises rectifying the generated AC power signals and phase shifting at least one of the DC power signals using power factor correction circuitry coupled to the alternators.

18. A downhole power generation apparatus, comprising:
a turbine;
a drive shaft coupled to the turbine;
a plurality of alternators coupled to the drive shaft and electrically connected in parallel, wherein when the drive shaft rotates, the plurality of alternators generate alternating current (AC) power signals;
a plurality of power factor correction circuitry coupled respectively to each one of the plurality of alternators to phase-shift at least one of the generated AC power signals; and
wherein each output of each of the plurality of power factor correction circuitry coupled to each of the plurality of alternators are connected in parallel with a link capacitance.

19. The downhole power generation apparatus of claim 18, wherein each of the plurality of power factor correction circuitry comprises rectification circuitry and phase shift circuitry.

20. The downhole power generation apparatus of claim 18, wherein the plurality of alternators are electrically connected in parallel through the plurality of power factor correction circuitry.

* * * * *